Nov. 17, 1931.  J. BORNSTEIN  1,832,082
WIPER MECHANISM FOR WINDSHIELDS AND THE LIKE
Filed July 13, 1929   4 Sheets-Sheet 1
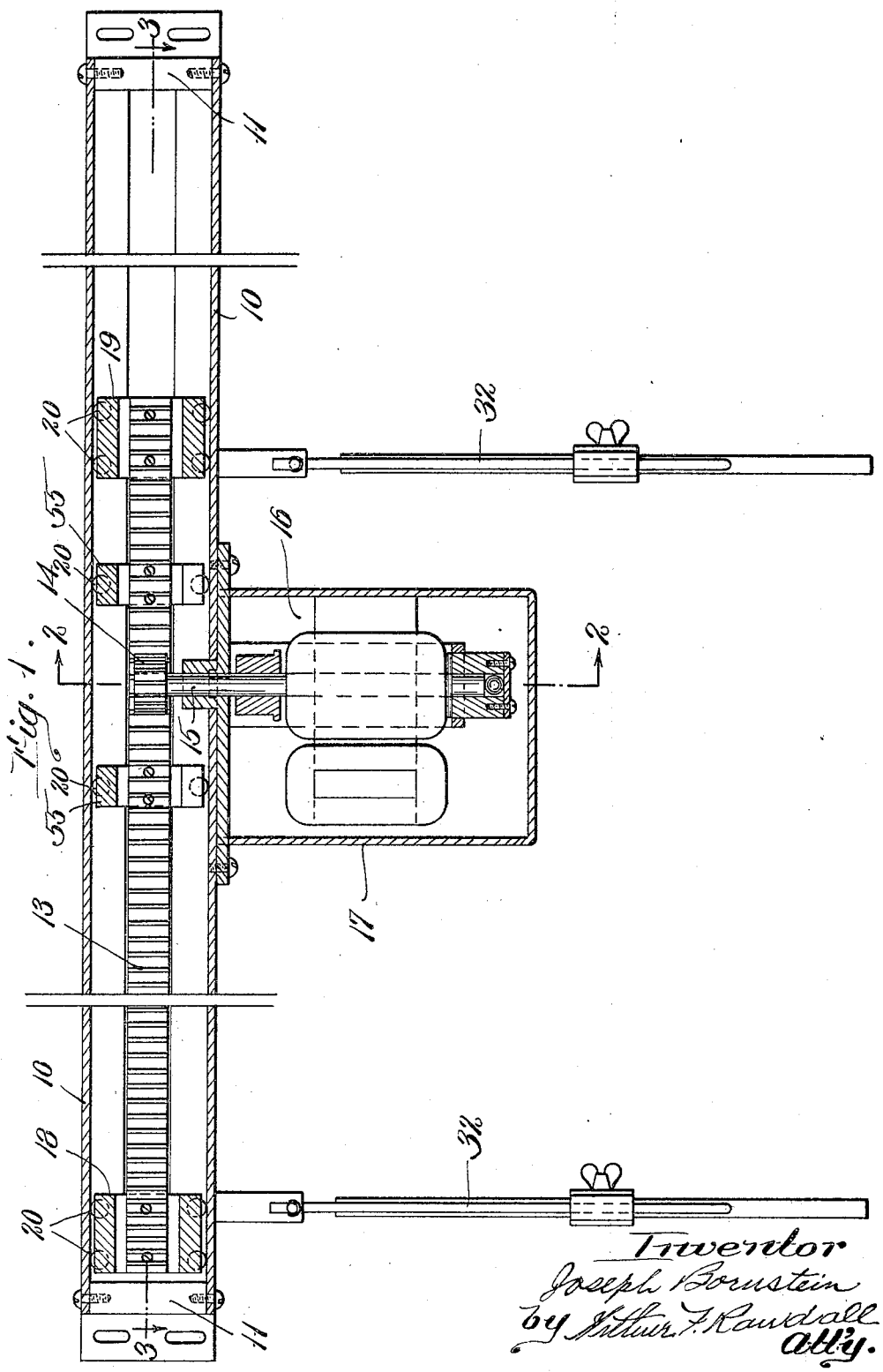
Inventor
Joseph Bornstein
by Arthur F. Randall
Att'y.

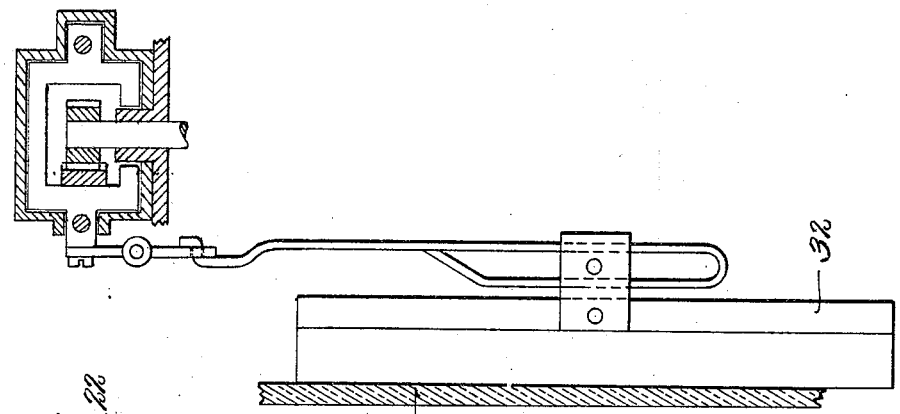
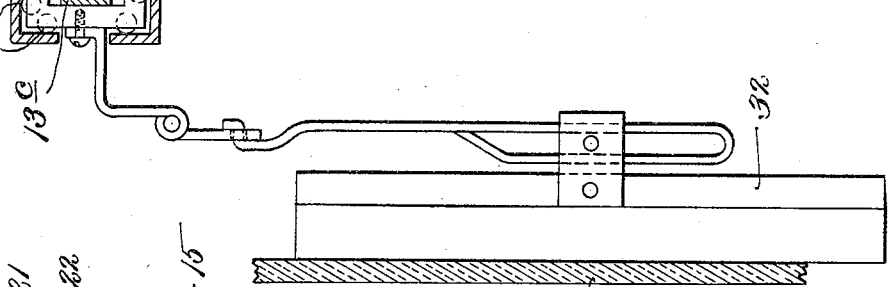
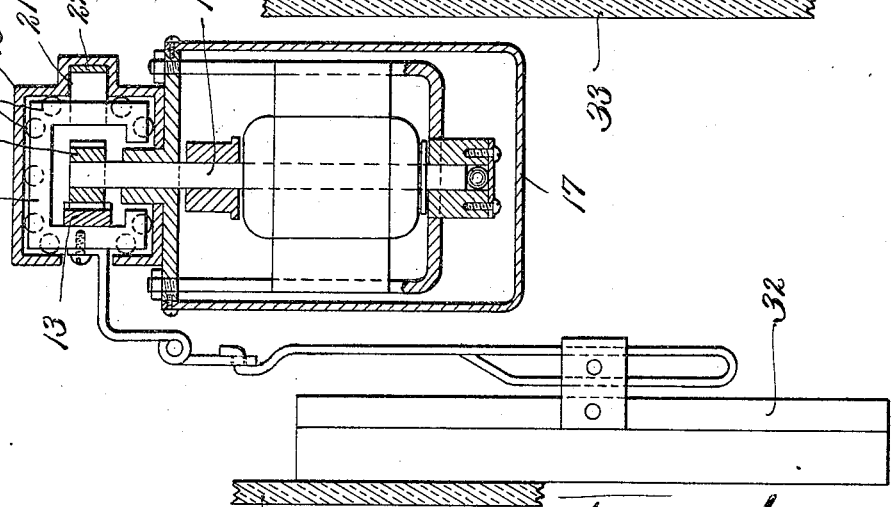

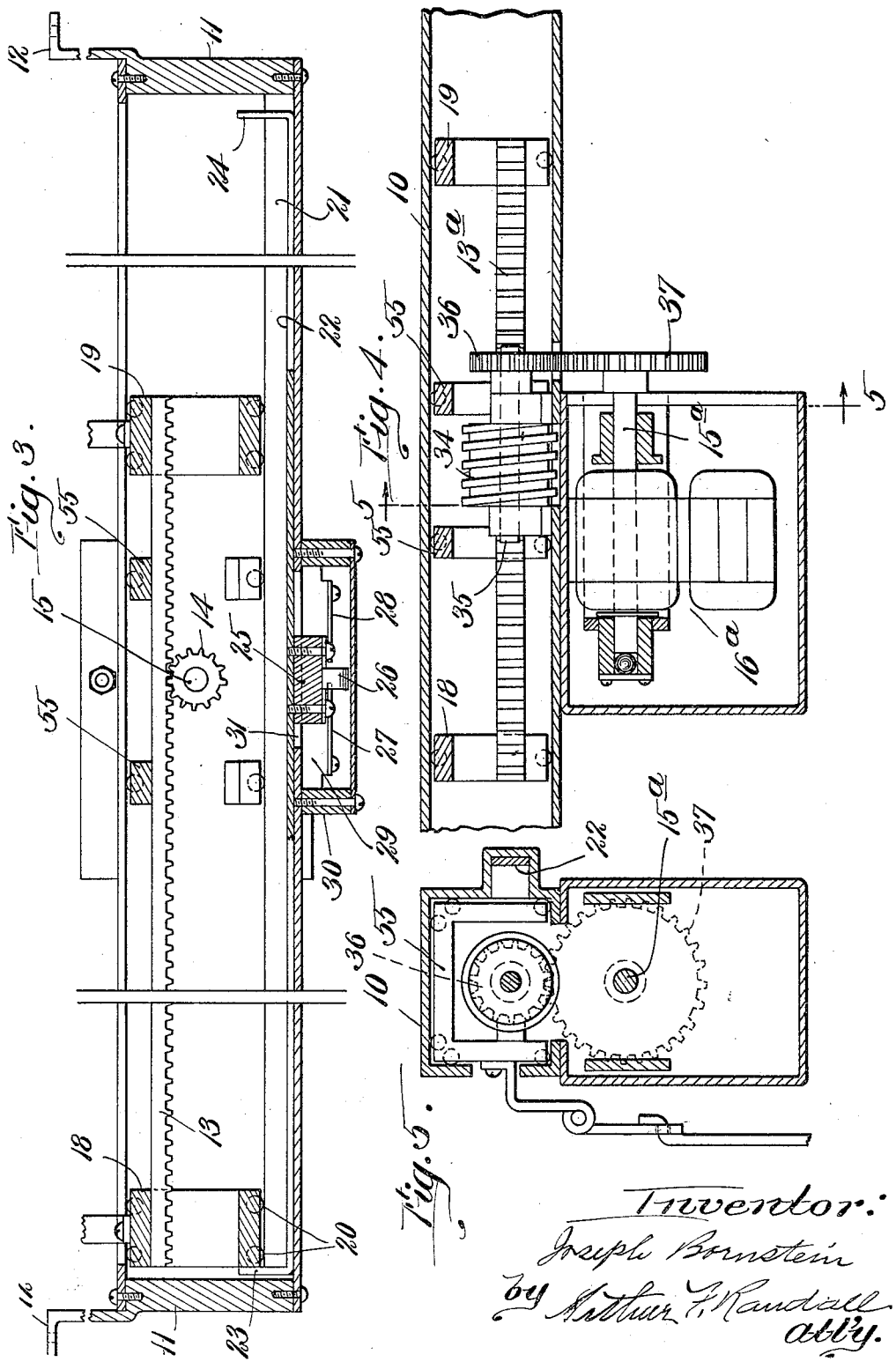

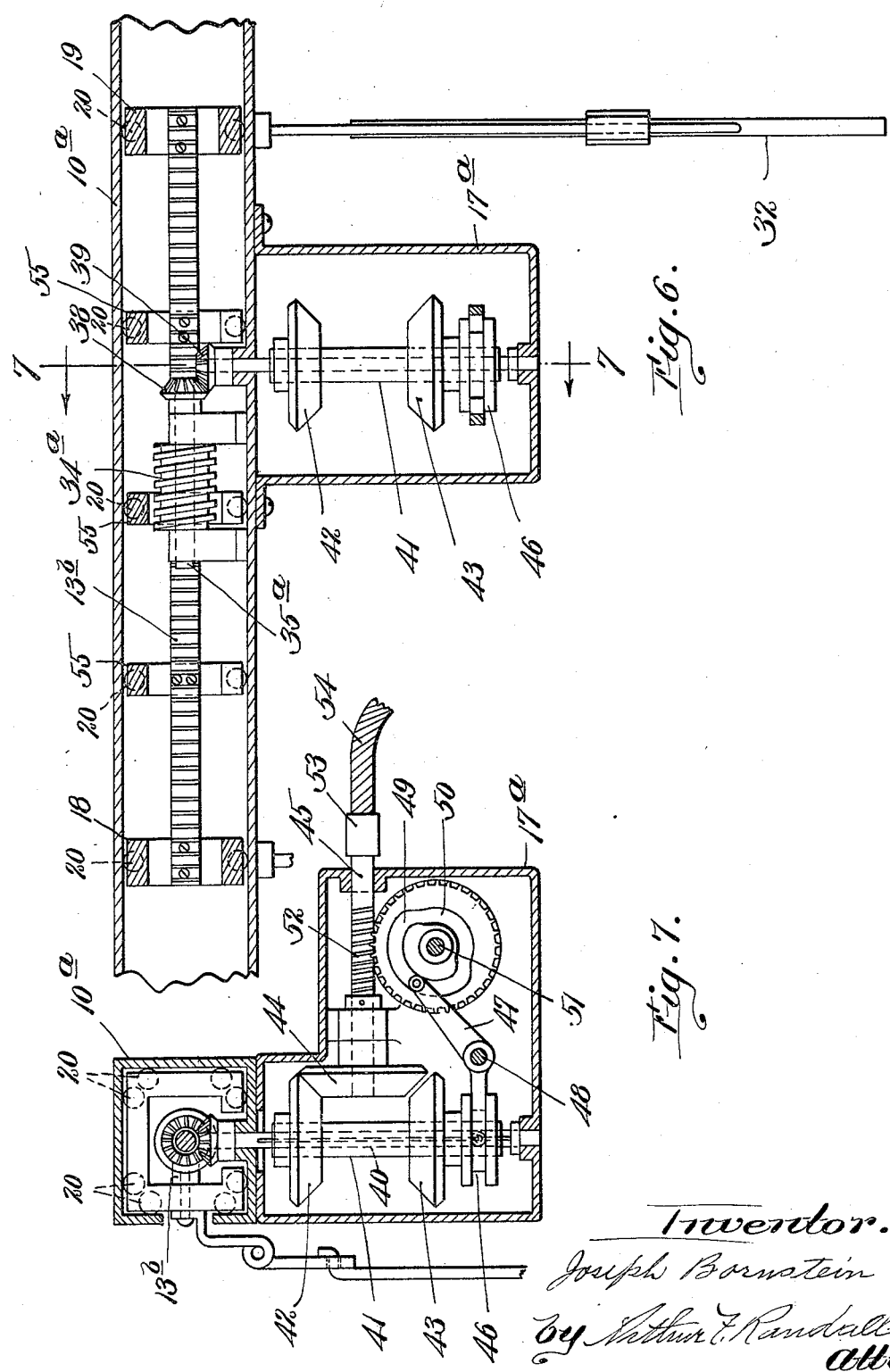

Patented Nov. 17, 1931

1,832,082

UNITED STATES PATENT OFFICE

JOSEPH BORNSTEIN, OF BOSTON, MASSACHUSETTS, ASSIGNOR TO LOUIS BORNSTEIN, OF QUINCY, MASSACHUSETTS

WIPER MECHANISM FOR WINDSHIELDS AND THE LIKE

Application filed July 13, 1929. Serial No. 378,143.

My invention relates to automatic wiping or cleaning mechanisms for windshields, windows and the like, and particularly to that class of mechanism which comprises one or more wiper elements reciprocated back and forth across the outer side of the window or windshield to maintain the latter in a clean condition.

A windshield wiping or cleaning mechanism for automobiles and other vehicles is continuously subjected to shocks and vibration and when in use is continuously in operation, sometimes for long periods of time. Also, in the case of the particular class of mechanism above referred to, the wiper carriage and its actuating devices are subjected to the effects of the shocks and strains occasioned by and accompanying the abrupt reversal of the direction of movement of said wiper carriage at the end of each stroke thereof. Therefore, the production of a practical windshield wiper for vehicles requires a light and durable construction which will not only withstand the shocks and vibrations transmitted to it from the vehicle but which will also properly withstand, or minimize the effects of the shocks and strains occasioned by the periodic and rapidly repeated reversal of the direction of movement of its parts.

Also, in the production of a practical commercial form of mechanism, it is required that the cost of manufacture, friction and wear of parts and consumption of power, be reduced to a minimum.

My invention has for its object to provide an improved wiping or cleaning mechanism especially adapted for use upon automobiles and other vehicles, and particularly to provide a mechanism of this type which will meet the requirements just referred to.

To these ends I have provided an improved wiping or cleaning mechanism of the class described having the peculiar features of construction and mode of operation set forth in the following description, the several novel features of the invention being particularly pointed out and defined in the claims at the close thereof.

In the accompanying drawings:—

Figure 1 is an elevation partly in section of an automatic windshield wiper or cleaner constructed in accordance with my invention.

Figure 2 is a section on line 2—2 of Fig. 1.

Figure 3 is a section on line 3—3 of Fig. 1.

Figure 4 is a longitudinal sectional view illustrating another form of my invention.

Figure 5 is a section on line 5—5 of Fig. 4.

Figure 6 is a longitudinal sectional view illustrating a third form of my invention.

Figure 7 is a section on line 7—7 of Fig. 6.

Figures 8 and 9 illustrate modifications.

The structure of Figs. 1 to 4, inclusive, comprises a frame including a molded tubular sheet metal section 10 whose opposite ends are telescopically engaged with, and fastened by screws to, brackets 11 each made with an apertured base 12 adapted to be bolted or otherwise rigidly fastened to the frame of an automobile windshield or the like.

Within the tubular section 10 is a wiper carriage including, as a part thereof, a longitudinally disposed rack 13 meshing with a pinion 14 fast on the upper end of the vertically disposed armature shaft 15 of a motor 16, said motor being mounted within a motor housing 17 fastened to the under side of the tubular section 10.

The ends of rack 13 are fixed rigidly to two rectangular yokes 18 and 19 each formed with recesses or pockets adjacent its eight corners within which are loosely mounted anti-friction balls 20 which ride against the inner sides of the walls of the section 10 when the wiper carriage of which they form part is reciprocated by pinion 14 as presently to be described.

As shown in Figs. 2 and 3, the front wall of section 10 is formed upon its inner side with a longitudinal groove or channel 21 within which is slidably mounted a bar 22 provided at its opposite ends with inwardly projecting arms 23 and 24 occupying positions in the paths of the yokes 18 and 19, respectively.

This slide bar has fixed to its outer side a metal block 25 carrying a spring contact 26 that co-operates with two fixed contacts 27 and 28 mounted upon a block of insulation 29 fastened to the outer side of the front wall of section 10.

The three contacts are inclosed by a switch-box 30 constructed upon the front wall of the section 10, and the block 25 extends from slidebar 22 through a longitudinal slot 31, formed in said front wall, into this switchbox.

The three contacts 26, 27 and 28, are connected in circuit with the motor 16 in a manner not shown, but which will be readily understood by an electrician, so that when spring contact 26 is in engagement with fixed contact 27 the wiper carriage is driven toward the right by the motor (Figs. 1 and 3) and when in engagement with fixed contact 28 it is driven in the opposite direction.

It will therefore be clear that when the apparatus is in operation the yoke 19 acts through arm 24 and slide 22 to shift the spring contact 26 from fixed contact 27 onto fixed contact 28 as the wiper carriage completes its movement toward the right whereupon the direction of travel of said carriage, is reversed. Likewise, when the carriage arrives at the limit of its movement toward the left the yoke 18 acts through arm 23 and slide 22 to shift the spring contact 26 from fixed contact 28 onto fixed contact 27 whereupon the direction of travel of the wiper carriage is again reversed.

In this way the wiper carriage is continuously reciprocated within the tubular frame section 10 while the apparatus is in operation.

It will be understood that the spring contact 26 is carried past its intermediate or "dead center" position by the momentum of the moving parts of the apparatus.

The wiper carriage including the rack 13 and yokes 18 and 19 has fixed to it a pair of wipers 32 yieldingly held against the front side of the windshield glass 33 in the usual fashion and these two wipers are spaced apart and reciprocated so that one of them is reciprocated between one side of the windshield and the middle thereof while the other wiper is reciprocated between the opposite side of the windshield and the middle.

It is a feature of the invention that the paths of the two wipers 32 overlap at the middle of the windshield thereby avoiding the production of a streak or uncleaned narrow vertical region at the middle of the windshield as has heretofore been the case where the inward strokes of the wipers terminated at or just short of a vertical median line through the windshield glass.

In the structure of Figs. 4 and 5 the rack 13a is engaged by a worm 34 fast on a shaft 35 journaled in bearings provided within the tubular frame section 10. At one end thereof the shaft 35 carries a gear 36 driven by a gear 37 fast on the armature shaft 15a of a motor 16a.

This form of my invention is also provided with an automatically operated motor reversing switch like that already described, the slide-bar of which is shown at 22 in Fig. 5.

In the structure of Figs. 6 and 7 the wiper carriage rack 13b is also engaged by a worm 34a fast on a short shaft 35a journaled in bearings provided upon the interior of tubular frame section 10a, but in this case the shaft 35a is provided at one end with a beveled gear 38 driven by a bevel gear 39 fast on the upper end of a vertical shaft 40 inclosed by a housing 17a fixed to the bottom of the tubular frame section 10a.

Shaft 40 is journaled in bearings provided on section 10a and housing 17a and upon it is loosely splined a sleeve 41 carrying two oppositely positioned beveled gears 42 and 43 which alternately co-operate with a driving beveled gear 44 fast on one end of a short shaft section 45 journaled in bearings on the housing 17a.

Sleeve 41 is made adjacent its lower end with an annular groove 46 engaged by a forked arm that is part of a shipper lever 47 fulcrumed at 48 on housing 17a. The other arm of lever 47 carries a cam roll occupying a cam groove 49 formed in one side of a worm gear 50 supported by a shaft 51 journaled in bearings on housing 17a.

The worm gear 50 is continuously driven by a worm 52 formed on shaft section 45 and the cam 49 is so shaped that it acts through lever 47 to maintain beveled gear 42 in mesh with driving gear 44 during one half of the revolution of worm wheel 50 and to maintain beveled gear 43 in mesh with driving gear 44 during the other half of the revolution of worm wheel 50. Thus sleeve 41 and vertical shaft 40 are alternately rotated first in one direction and then in the opposite and said shaft 40 acts through the connections described to reciprocate the wiper carriage which includes the rack 13b.

A flexible shaft 54 has one end thereof fastened by a coupling 53 to the outer end of the shaft section 45 and the opposite end of said flexible shaft is connected as usual with a continuously rotating element of the vehicle to which the windshield wiper is applied. Thus when the wiper apparatus is in operation the worm gear 50 and driving gear 44 are continuously rotated to uninterruptedly reciprocate the wiper carriage, the latter moving from one extreme of its movement across the windshield and back again to its starting point during one revolution of the worm gear 50. It will be understood, of course, that an electric motor continuously operating in one direction may, if desired, be substituted for the flexible shaft drive 54.

It is a feature of my invention embodied in the structure shown in Figs. 6 and 7 that the adjustment of the driving devices for the worm or other carriage-engaging actuator 34a is affected by means operating independently of the carriage. That is to say in the embodiment this feature of my invention herein illustrated the shipper member, shown as a lever 47, is periodically adjusted by means which is continuously driven by the continuously driven shaft 45 and the shifting of this lever or member from one position to the opposite in order to reverse the direction of travel of the carriage is in no way dependent upon the movement of the carriage itself.

Figure 8 illustrates a modification of the form of my invention shown in Figs. 1, 2 and 3. In this structure of Fig. 8 the rack 13c forming part of the wiper carriage is engaged by a worm 34b whose shaft 35b is driven alternately in opposite directions by an electric motor, not shown, which is automatically reversed at the end of each stroke of the wiper carriage by means of a reversing switch such as already described and which includes the slide-bar 22.

In all four forms of my invention illustrated in Figs. 1 to 8, inclusive, the rack-bar forming part of the wiper carriage is made as small and light as is possible and yet retain the necessary strength and wear-resisting capacity. Therefore, in order to support the portion of each of these rack-bars that is between the two end yokes 18 and 19 against vibration, and to maintain the same in proper position to cooperate with the member by which it is reciprocated, I provide one or more, usually a plurality, of intermediate rectangular yokes 55 to which said rack-bar is fastened.

These intermediate yokes 55 are constructed on the same principle as the yokes 18 and 19 and by their engagement with the inside of the tubular section of the frame serve to hold against vibration the intermediate portion of the rack to which they are secured, and to maintain the same in proper engagement with the member by which said rack is reciprocated. These intermediate yokes 55 are also made smaller than the end yokes 18 and 19 and add little to the weight of the structure.

In the form illustrated in Fig. 9 the frame of the wiper mechanism includes two longitudinally disposed rods or rails 56 fastened at their opposite ends to the end brackets 11, 11 which latter are shown in Fig. 1. The sheet metal tubular sections 10, 10a, etc., are molded to shape and it is not possible to produce a quantity of these sections that are all exactly alike as to inside shape and dimensions, and for this reason I have illustrated in Fig. 9 a construction where the wiper carriage yokes are supported and guided mainly by these rods or rails 56, said yokes being loosely fitted to the interior of the tubular frame-section. The rails or rods 56 are necessarily made very small in diameter and quite long and it will therefore be clear that while the yokes are mainly supported by these rods or rails 56 any tendency of said rods 56 to flex laterally, or to vibrate, is opposed by the engagement of the yokes with the interior of the tubular frame-section.

From the above description it will be seen that an important feature of the several forms of the invention herein illustrated consists in providing a wiper carriage within a tubular frame section, said wiper carriage including a longitudinally disposed rack-bar provided with means for engaging opposite sides of said tubular section whereby said bar is held by the tubular section against lateral displacement, vibration or flexing, the carriage at the same time being free to move longitudinally within said tubular section.

What I claim is:

1. An apparatus of the character described comprising a frame adapted to be fixed to a support in a position adjacent the windshield or the like that is to be operated upon, said frame being made with longitudinal ways; a wiper carriage mounted on said ways including a rack-bar and a pair of end yokes to which the opposite end portions of said rack bar are secured, said yokes each embracing its end of said rack-bar and abutting said ways at opposite sides of said rack-bar to support the latter against lateral displacement, and means engaging said rack-bar to reciprocate said wiper carriage.

2. An apparatus of the character described comprising a frame adapted to be fixed to a support in a position adjacent the windshield or the like that is to be operated upon, said frame being made with longitudinal ways; a wiper carriage mounted on said ways including a rack-bar and a plurality of yokes through which said rack-bar extends and to which it is rigidly fastened at intervals throughout its length, each yoke abutting said ways at opposite sides of said rack-bar to support the latter against lateral displacement, and means engaging said rack-bar to reciprocate said wiper carriage, some of said yokes being constructed to straddle said rack-bar reciprocating means when passing the same.

3. An apparatus of the character described comprising a tubular frame adapted to be fixed to a support in a position adjacent the windshield or the like that is to be operated upon; a wiper carriage within said tubular frame including a longitudinally disposed bar, said carriage abutting the interior of said tubular frame at opposite sides of said rack to hold the same against lateral displacement in any direction, and means engaging said rack to reciprocate said wiper carriage.

4. An apparatus of the character described comprising a tubular frame adapted to be fixed to a support in a position adjacent the windshield or the like that is to be operated upon; a wiper carriage within said tubular frame including a rack-bar and yokes extending around said rack-bar to which the latter is rigidly fastened; a carriage supporting rail disposed longitudinally within said tubular frame on which said yokes are slidably supported, said yokes being loosely fitted within said tubular frame but so as to be held against lateral displacement by the latter, and means engaging said rack-bar to reciprocate said wiper carriage.

5. In an apparatus of the character described the combination of a frame; a wiper carriage movably supported on said frame; a continuously driven member; and gearing through which said continuously driven member operates said carriage, said gearing including a member that is periodically adjusted in timed relation with but otherwise independently of the movements of said carriage to cause said gearing to reciprocate said carriage.

6. In an apparatus of the character described the combination of a frame; a wiper carriage movably supported on said frame; a continuously driven member and gearing through which said continuously driven member operates said carriage, said gearing including a member that is adjustable to reverse the direction of movement imparted to said carriage by said gearing, and means through which said continuously driven member automatically and periodically adjusts said gearing member in timed relation with but otherwise independently of the movements of said carriage.

7. In an apparatus of the character described the combination of a frame; a wiper carriage movably mounted on said frame; a continuously driven shaft; gearing through which said continuously driven shaft actuates said carriage, said gearing including mechanism that is periodically adjusted to reverse the direction of movement of said carriage, and means operated by said continuously driven shaft which periodically adjusts said mechanism in timed relation with but otherwise independently of the movements of said carriage so as to cause said gearing to reciprocate the latter.

8. In an apparatus of the character described the combination of a frame; a wiper carriage movably mounted on said frame; a continuously driven shaft; gearing through which said continuously driven shaft actuates said carriage, said gearing including mechanism that is periodically adjusted to reverse the direction of movement of said carriage, a power transmitting member continuously driven by said shaft for periodically adjusting said mechanism in timed relation with the movements of said carriage but otherwise independently thereof, and means through which said power transmitting member periodically adjusts said mechanism.

9. In an apparatus of the character described the combination of a frame; a wiper carriage movably mounted on said frame; a continuously driven shaft; gearing through which said shaft actuates said carriage, said gearing including a member that is periodically adjusted to reverse the direction of movement of the carriage; a cam continuously driven by said shaft and operatively connected to said member for periodically adjusting said member in timed relation with the movements of the carriage so as to cause said gearing to reciprocate said carriage, said cam serving to hold said member in adjusted position during the travel of said carriage from a position at the limit of its movement in one direction to the limit of its movement in the opposite direction.

10. In an apparatus of the character described the combination of a frame; a movably supported wiper carriage; a continuously driven shaft; gearing through which said continuously driven shaft reciprocates said carriage, said gearing including a continuously rotating driving gear connected with said shaft and a pair of adjustable driven gears connected with said wiper carriage, and means through which said continuously driven shaft operates to periodically adjust said pair of driven gears whereby they are alternately engaged with said driving gear, said means operating to effect each adjustment of said pair of gears so that one of the gears of said pair is first moved out of mesh with the driving gear after which the other gear of said pair is moved into mesh with said driving gear.

Signed by me at Boston, Suffolk County, Massachusetts, this tenth day of July, 1929.

JOSEPH BORNSTEIN.

CERTIFICATE OF CORRECTION.

Patent No. 1,832,082. Granted November 17, 1931, to

JOSEPH BORNSTEIN.

It is hereby certified that error appears in the printed specification of the above numbered patent requiring correction as follows: Page 3, lines 122 and 125, claim 3, for "rack" read bar; and that the said Letters Patent should be read with these corrections therein that the same may conform to the record of the case in the Patent Office.

Signed and sealed this 9th day of February, A. D. 1932.

(Seal)

M. J. Moore,
Acting Commissioner of Patents.